United States Patent
Yen et al.

(10) Patent No.: US 7,860,307 B2
(45) Date of Patent: Dec. 28, 2010

(54) COLOR MATCHING METHOD, AND IMAGE CAPTURING DEVICE AND ELECTRONIC APPARATUS USING THE SAME

(75) Inventors: Chang Shih Yen, Taipei (TW); Makoto Tsuchimochi, Taipei (TW)

(73) Assignee: Sony Taiwan Limited, Taipei (TW)

( * ) Notice: Subject to any disclaimer, the term of this patent is extended or adjusted under 35 U.S.C. 154(b) by 659 days.

(21) Appl. No.: 11/904,383

(22) Filed: Sep. 27, 2007

(65) Prior Publication Data
US 2008/0079816 A1      Apr. 3, 2008

(30) Foreign Application Priority Data
Sep. 29, 2006   (TW) ............................. 95136425 A

(51) Int. Cl.
  *G06K 9/00*    (2006.01)
(52) U.S. Cl. ................ 382/167; 382/162; 382/164; 382/165; 382/166; 382/274; 348/222.1
(58) Field of Classification Search ............... 382/162, 382/164, 165, 166, 167, 261, 239, 274; 358/1.9, 358/520, 296; 345/589, 590, 591
See application file for complete search history.

(56) References Cited

U.S. PATENT DOCUMENTS

| 7,489,346 B2 * | 2/2009 | Mizukura et al. ......... 348/223.1 |
| 7,671,898 B2 * | 3/2010 | Chiba ...................... 348/222.1 |
| 2006/0012808 A1 * | 1/2006 | Mizukura et al. ............ 358/1.9 |

* cited by examiner

*Primary Examiner*—Samir A. Ahmed
*Assistant Examiner*—Ali Bayat
(74) *Attorney, Agent, or Firm*—Frommer Lawrence & Haug LLP; William S. Frommer

(57) ABSTRACT

A color matching method for a digital image. Signals of a plurality of main colors in the digital image are extracted and the extracted signals are used to generate a 3×3 color matrix. The signals of the plurality of main colors are transformed into a 3×1 input matrix formed by the intensity of illumination, the color hue, and the color saturation of each of the color signals. An output value and color difference of the plurality of the color signals are recursively calculated by performing an iteration operation based on an equation composed of the color matrix, a predefined weighting matrix and a fine-tuning matrix, until the color difference is smaller than a predetermined threshold value.

6 Claims, 4 Drawing Sheets

| | | | | | | |
|---|---|---|---|---|---|---|
| P | | 1 | 1.1 | 1.21 | 1.21 | 1.21 | 1.21 |
| D | | 1 | 1 | 1 | 2 | 2.13 | 2.13 |
| I | | 1 | 1 | 1 | 1 | 1 | |
| Number of times of iteration | | 127 | 53 | 32 | 36 | 37 | 21 |
| Maximum Overshoot | | 30 | 54 | 71 | 10 | 4 | 2 |

COLOR MATCHING METHOD, AND IMAGE CAPTURING DEVICE AND ELECTRONIC APPARATUS USING THE SAME

BACKGROUND OF THE INVENTION

1. Field of the Invention

The present invention relates to a color matching method and an image capturing device using the color matching method or an electronic apparatus provided with such image capturing device. More particularly, the present invention relates to a color matching method for handling an electronic digital image and an image capturing device using the color matching method or an electronic apparatus provided with such image capturing device.

2. Description of the Related Art

Recently, electronic apparatuses provided with a color image capturing device are widely used, for example, a digital camera, an electronic type video recorder, or a mobile phone. Generally, a semiconductor image sensor is provided in these electronic apparatuses for converting a captured image into an electrical signal. Due to the inherent limitations of the image sensor with respect to the color sensing performance, the color of an image outputted under such limitations is usually required to be adjusted. In addition, the color of the image is different depending on the light illumination conditions. For example, the perception of color for the human visual system is quite different in the moonlight and in the daylight outdoors. Therefore, it is important that the obtained electronic image is required to meet the perception of the human's visual sense in color processing.

In these electronic apparatuses, an image signal outputted from the image sensor will be subjected to a series of signal processing procedures in which the color of the obtained image will be corrected by performing a color matching process so as to output an image with a natural color.

Regarding the color correction process, a number of conventional techniques that adopt a correction matrix to correct the color of an image are known. For example, U.S. Pat. No. 7,053,935 has disclosed one advantage over current electronic capture systems that the accuracy of color capture, which is a result of the match between the human visual system and the unique set of spectral response curves and the correction matrix used in the invention. However, the color correction result cannot be dynamically adjusted since the matrix is predefined, and thus a quick, accurate color correction result is difficult to be achieved, and a high-quality image cannot be offered.

As a result, in the conventional technique described above, since a fixed correction matrix is used to correct the color of the image, the color difference is large and cannot be rapidly converged to a predetermined value.

Therefore, a color matching method capable of dynamically adjusting the color difference and rapidly converging the color difference to the predetermined value is required for achieving a color demonstration with high color accuracy.

SUMMARY OF THE INVENTION

To achieve the requirement of a high color perception, the accuracy of color is an important issue in color processing. Therefore, the present invention adopts the concept of a recursive approach to minimize the color difference.

According to the present invention, the color difference can be highly accurately and rapidly converged by using a dynamically adjusted fine-tuning matrix so as to demonstrate a highly natural color image.

An object of the present invention is to provide a color matching method capable of carrying out the color correction function of a digital image, and a color correction process can be performed on the obtained image based on a plurality of main colors in the obtained image.

In accordance with an aspect of the present invention, there is provided a color matching method for a digital image comprising a step of extracting signals of a plurality of main colors in the digital image as input signals; a step of transformation for generating a 3×3 color matrix from the signals of the plurality of main colors and transforming the signals of the plurality of main colors into a 3×1 input matrix formed by the intensity of illumination, the color hue, and the color saturation of each of the color signals, which are referred to as Lab coordinates; and a step of color-difference calculation for recursively calculating an output value and color difference of the plurality of the color signals by performing an iteration operation based on an equation composed of said color matrix, a predefined weighting matrix and a fine-tuning matrix, until said color difference is smaller than a predetermined threshold value.

Further, the value of each of the elements in the fine-tuning matrix can be dynamically changed based on the current color difference and the previous color difference so as to rapidly obtain the color difference smaller than the predetermined threshold value. In addition, the iteration operation can be performed on a multi-dimensional color without any limitation on the number of times that the iteration operation performed so as to achieve a highly natural demonstration of a color image with a small color difference.

In accordance with another aspect of the present invention, there is provided an image capturing device and an electronic apparatus capable of rapidly and highly accurately performing the color correction process on the obtained image so as to provide a highly natural demonstration of a color image with a small color difference.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The accompanying drawings, which are incorporated in and constitute a part of this specification, illustrate preferred embodiments of the invention and, together with a general description of the invention given above, and the detailed description of the embodiment given below, serve to explain the principles of the invention, in which.

DETAILED DESCRIPTION OF PREFERRED EMBODIMENTS

Embodiments in accordance with the present invention will be described with reference to the accompanying drawings.

Figure 1:
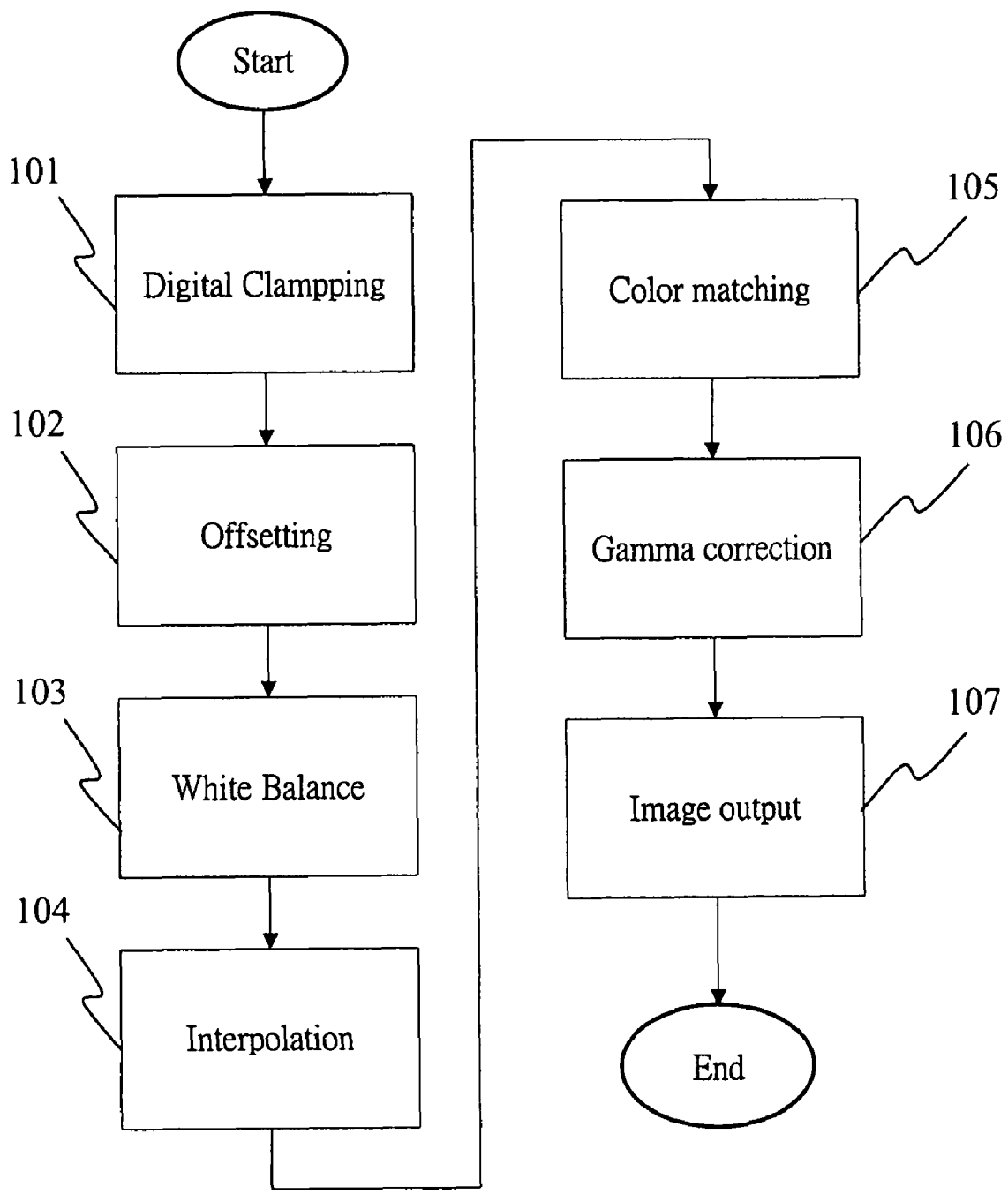
FIG. 1 is a flow chart showing a general processing operation for a digital image.

FIG. 1 is a flow chart showing a general processing operation for a digital image. As shown in FIG. 1, a signal output of an original image obtained from an image sensor in an image capturing device is subjected to a digital clamping process in step 101. In step 101, by using the optical black as a reference black level in a color sensor, values of color channels such as the obtained red color, green color, blue color (hereinafter referred to as "RGB"), and the like are subtracted from the reference black level such that the color base of each of the color channels is not greatly changed or a remarkable error is not caused by the physical color performance of the color sensor with respect to different colors.

Next, the operation proceeds to step 102 for performing a channel offsetting process on the image signal. In step 102, the clamped color channels such as RGB is subjected to the channel offsetting process such that these color channels are of a same or an extremely similar level. The color channels (RGB) subjected to the above processes will have the same color base and the numerical resolution thereof can be extended to a maximum value.

Then, the operation proceeds to step 103. In step 103, a color white balance process is performed on the image signal obtained in step 102 such that the color performance is the same as the grey level.

Thereafter, the operation proceeds to step 104 for performing an image interpolation process. The three primary colors (i.e., RGB) of the image signal obtained in step 103 are combined to form a real picture to be displayed.

After the image interpolation process is performed on the image signal obtained in step 104, the color of the obtained image may be not so accurate at this time, and thus a color matching process is required such that the obtained image can be adjusted to an image with high color accuracy. Therefore, the operation proceeds to step 105 for performing the color matching process.

Finally, the image signal obtained in step 105 is subjected to a gamma correction process in step 106. The captured image can be demonstrated with an accurate color depending on various kinds of output devices, and then the resulting image signal is outputted in step 107.

The completion of the general processing operation for a digital image is required to go through the above processing steps. However, since the color matching process in the related prior art techniques is perform by using a predetermined fixed correction matrix, it is difficult to accurately obtain a high quality image with an accurate color performance in a short time. Below a color matching method used for the image processing in accordance with the present invention will be described in detail.

Figure 2:
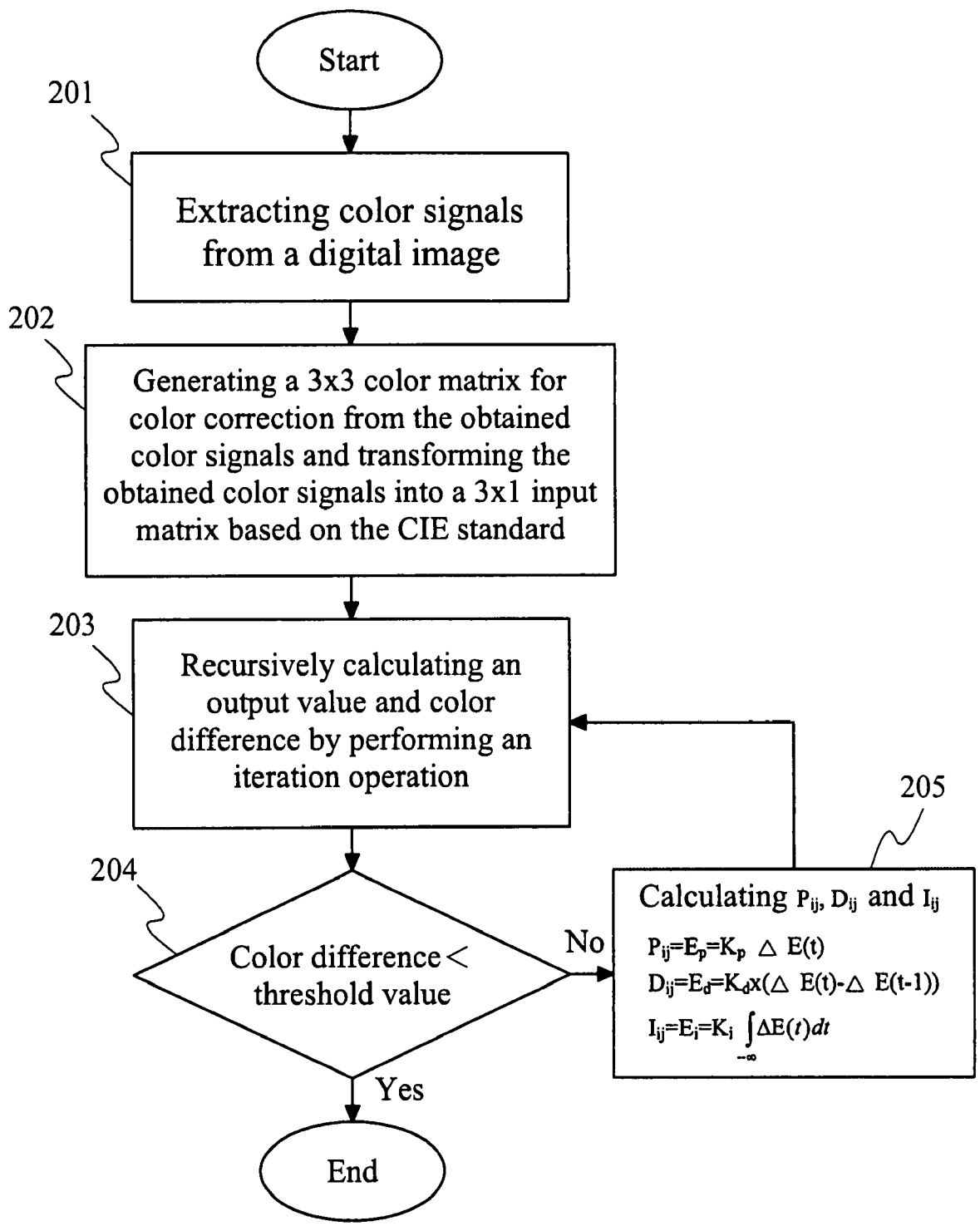
FIG. 2 is a flow chart showing the color matching method in accordance with the present invention.

FIG. 2 is a flow chart showing the color matching method in accordance with the present invention.

Figure 3:
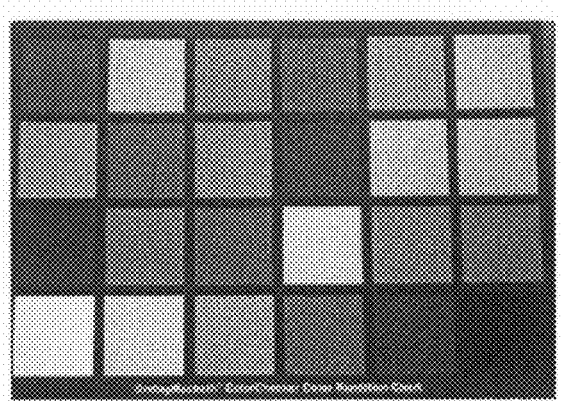
FIG. 3 shows a color map captured by an image capturing device for image processing.

As shown in FIG. 2, signals of the three main colors (i.e., RGB) are extracted from a digital image in step 201, which are referred to the blue color in the first column of the third row, the green color in the second column of the third row, and the red color in the third column of the third row as shown in FIG. 3. FIG. 3 shows a color map captured by the image capturing device for image processing.

Next, the method proceeds to step 202. In step 202, a 3×3 color matrix (1) for color correction is generated from the signals of the three spectral colors of red, green and blue (RGB) based on the well-known CIE (Commission Internationale De L'Eclairage) transformation (standard), and the signals of the three spectral colors RGB are simultaneously transformed to a corresponding 3×1 input matrix (2). The 3×3 color matrix (1) and 3×1 input matrix (2) are given below:

$$\begin{bmatrix} a_{11} & a_{12} & a_{13} \\ a_{21} & a_{22} & a_{23} \\ a_{31} & a_{32} & a_{33} \end{bmatrix} \qquad \text{matrix (1)}$$

$$\begin{bmatrix} L_{in} \\ a_{in} \\ b_{in} \end{bmatrix} \qquad \text{matrix (2)}$$

where the color matrix (1) is obtained by the calculation based on the CIE and the obtained color signals and each of the elements $a_{11}$ to $a_{33}$ in the color matrix (1) is a real number, and in the input matrix (2), $L_{in}$ is representative of the intensity of illumination of each of the color signals; $a_{in}$ is representative of the color hue of each of the color signals; and $b_{in}$ is representative of the color saturation of each of the color signals, and the three parameters (elements) in the input matrix (2) are generally referred to as Lab coordinates.

In this embodiment, the color matrix (1) and the input matrix (2) obtained with respect to the red color, the blue color, and the green color are respectively given as follows:

$$\begin{bmatrix} a_{11} & a_{12} & a_{13} \\ a_{21} & a_{22} & a_{23} \\ a_{31} & a_{32} & a_{33} \end{bmatrix} \begin{bmatrix} 0.94 & -0.08 & 0.14 \\ 0.13 & 0.81 & 0.08 \\ -0.27 & 0.32 & 0.60 \end{bmatrix}$$

$$\text{for the blue color } \begin{bmatrix} L_{in} \\ a_{in} \\ b_{in} \end{bmatrix} \begin{bmatrix} 25.408 \\ -17.46 \\ -52.8 \end{bmatrix}$$

$$\text{for the green color } \begin{bmatrix} L_{in} \\ a_{in} \\ b_{in} \end{bmatrix} \begin{bmatrix} 57.993 \\ -43.63 \\ 42.28 \end{bmatrix}$$

$$\text{for the red color } \begin{bmatrix} L_{in} \\ a_{in} \\ b_{in} \end{bmatrix} \begin{bmatrix} 53.75 \\ 95.18 \\ 9.35 \end{bmatrix}$$

As described above, based on the CIE standard, a basic linear color matrix is generated after the application of the RGB transformation so as to be used for the color correction described later.

Then, the method proceeds to step 203. In step 203, the obtained matrices are applied to Equation (1) as shown below for performing an iteration operation for the color correction.

$$\begin{bmatrix} L_{out} \\ a_{out} \\ b_{out} \end{bmatrix} = \left( \begin{bmatrix} a_{11} & a_{12} & a_{13} \\ a_{21} & a_{22} & a_{23} \\ a_{31} & a_{32} & a_{33} \end{bmatrix} + \begin{bmatrix} w_{11} & w_{12} & w_{13} \\ w_{21} & w_{22} & w_{23} \\ w_{31} & w_{32} & w_{33} \end{bmatrix} \begin{bmatrix} k_{11} & k_{12} & k_{13} \\ k_{21} & k_{22} & k_{23} \\ k_{31} & k_{32} & k_{33} \end{bmatrix} \right) \times \begin{bmatrix} L_{in} \\ a_{in} \\ b_{in} \end{bmatrix} \qquad \text{Equation (1)}$$

where $$\begin{bmatrix} w_{11} & w_{12} & w_{13} \\ w_{21} & w_{22} & w_{23} \\ w_{31} & w_{32} & w_{33} \end{bmatrix}$$

is referred to as a weighting matrix, and $$\begin{bmatrix} k_{11} & k_{12} & k_{13} \\ k_{21} & k_{22} & k_{23} \\ k_{31} & k_{32} & k_{33} \end{bmatrix}$$

is referred to as a fine-tuning matrix.

The value of each of the elements in the weighting matrix is a default value. In this embodiment, the weighting matrix is:

$$\begin{bmatrix} w_{11} & w_{12} & w_{13} \\ w_{21} & w_{22} & w_{23} \\ w_{31} & w_{32} & w_{33} \end{bmatrix} = \begin{bmatrix} 0.98 & 0.01 & 0.01 \\ 0.01 & 0.98 & 0.01 \\ 0.01 & 0.01 & 0.98 \end{bmatrix}$$

In accordance with the present invention, each of the elements in the fine-tune matrix is defined as $k_{ij}=P_{ij}+D_{ij}+I_{ij}$ where the $P_{ij}$, $D_{ij}$, and $I_{ij}$ are described later.

Based on CIE 1976, the color difference $\Delta E$ is defined as:

$$\Delta E = \sqrt{(L_{out} - L_{Ref})^2 + (a_{out} - a_{Ref}) + (b_{out} + b_{Ref})^2}$$

where $L_{out}$, $a_{out}$, and $b_{out}$ are the Lab coordinates of the outputted color signal obtained by calculation, and $L_{Ref}$, $a_{Ref}$, and $b_{Ref}$ are reference values of the obtained Lab coordinates of the color signal. In other words, the color difference refers to the difference between the outputted color and the captured real color. The color difference function $\Delta E$ can be indicated by the distance between the Lab coordinates.

In step 203, according to Equation (1), the iteration operation is applied on each of the colors, and the color difference is obtained by comparing the operation result and the reference value for each of the colors. In accordance with the present embodiment, the operation is merely applied on the red, blue and green colors. However, in accordance with the present invention, the operation can be applied on a variety of different colors. That is, a multi-dimensional color operation can be performed.

Next, the method proceeds to step 204. In step 204, the color difference value obtained in step 203 is compared with a predetermined threshold value. If the color difference value is smaller than the threshold value, it is indicated that the desired color correction has been achieved and the color matching process is stopped. If the color difference value is larger than the threshold value, then the method proceeds to step 205 and new $P_{ij}$, $D_{ij}$, and $I_{ij}$ are calculated based on Equation (2):

$$P_{ij}=Ep=K_p \times \Delta E(t)$$

$$D_{ij}=Ed=K_d \times (\Delta E(t)-\Delta E(t-1))$$

$$I_{ij}=Ei=K_i \int_{-\infty} \Delta E(t)dt$$

Equation (2)

where $K_p$, $K_d$, and $K_i$ are respectively the coefficient of proportional control, the coefficient of derivative control, and the coefficient of integral control; and $\Delta E(t)$ is representative of the current color difference value; and $\Delta E(t-1)$ is representative of the previously stored color difference value.

Then, turning back to step 203, the obtained new $P_{ij}$, $D_{ij}$, and $I_{ij}$ are replaced for the original $P_{ij}$, $D_{ij}$, and $I_{ij}$ in the fine-tune matrix of Equation (1) to perform the iteration operation.

In this manner, the iteration operation is performed until the color difference value is smaller than the threshold value.

In accordance with the present embodiment, the value of each of the elements under the condition of i=j is different from the value of each of the elements under the condition of i≠j in the fine-tuning matrix, whereas the value of each of the elements is identical for i=j and the value of each of the elements is also identical for i≠j. That is, the fine-tune matrix in accordance with the present embodiment is given below:

$$\begin{bmatrix} 1.21Ep+2.13Ed+0.53Ei & 1.1Ep+3Ed+0.5Ei & 1.1Ep+2Ed+0.5Ei \\ 1.1Ep+2Ed+0.5Ei & 1.21Ep+2.13Ed+0.53Ei & 1.1Ep+2Ed+0.5Ei \\ 1.1Ep+2Ed+0.5Ei & 1.1Ep+2Ed+0.5Ei & 1.21Ep+2.13Ed+0.53Ei \end{bmatrix}$$

Figure 4:
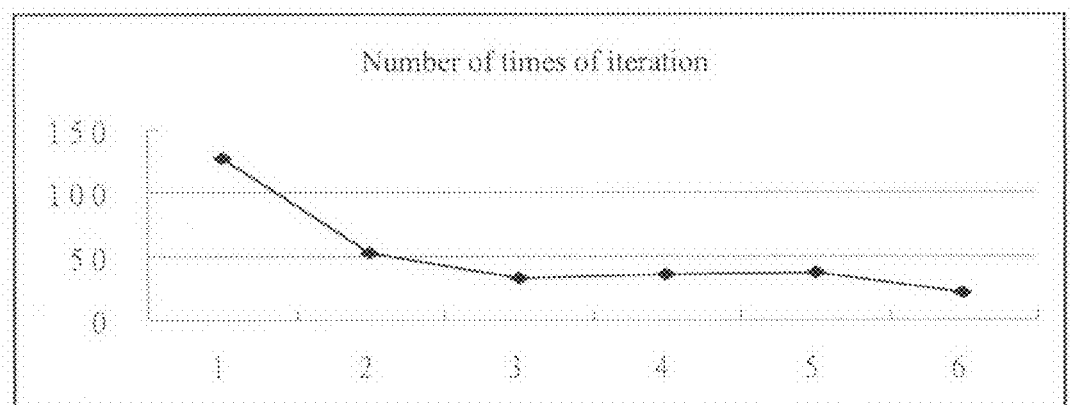
FIG. 4 shows the number of times of the iteration operation required to achieve the desired color difference and the maximum overshoot in accordance with the color matching process of the present embodiment when taking different $K_p$, $K_d$, and $K_i$ values.
Figure 5A:
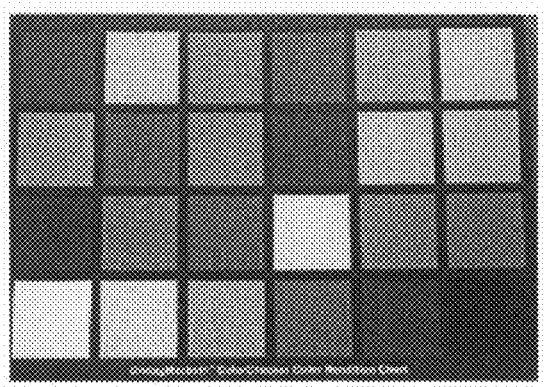
FIG. 5($a$) is a diagram showing the picture before the color correction process is performed and the CIE Lab coordinates thereof, and FIG. 5($b$) is a diagram showing the picture after the color correction process is performed and the CIE Lab coordinates thereof.
Figure 5A:
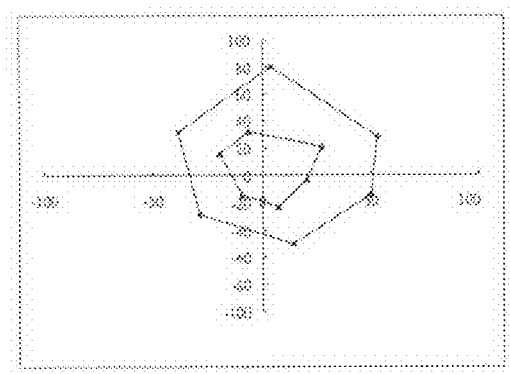
Figure 5B:
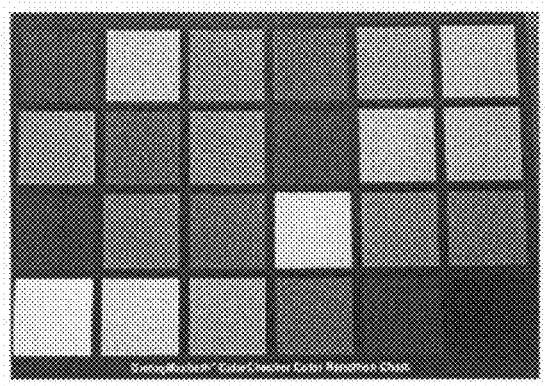
Figure 5B:
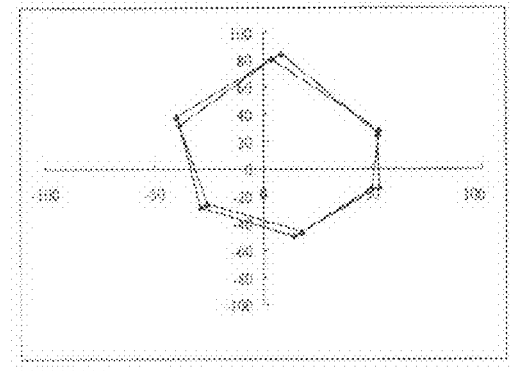

Based on the above, the color matching process is recursively performed by taking different $K_p$, $K_d$, and $K_i$ values, and the obtained results are shown in FIG. 4. FIG. 4 shows the number of times of the iteration operation required to achieve the desired color difference and the maximum overshoot in accordance with the color matching method of the present embodiment when taking different $K_p$, $K_d$, and $K_i$ values. Based on the results shown in FIG. 4, it can be known that when the error becomes larger, a larger $K_p$ value typically indicates a faster response, and this means that the feedback to be compensated becomes larger. A larger $K_d$ value will cause the reduction of the overshoot of the adjusted compensation and the distinction of the color difference direction. A larger $K_i$ value implies the elimination of the error in a steady state. However, the tradeoff is to cause a larger overshoot in the compensation and slow down the approximation to a target value.

Through the operation steps as described in the above, by using the three main spectral colors RGB in the standard color map which is taken as the reference, the fine-tuning matrix required for the color matching of the image processing can be obtained. When the color matching process of an arbitrarily captured image is performed, the value of each element in the fine-tuning matrix may be changed each time when the color difference of the iteration operation is varied. Therefore, the value of each element in the fine-tuning matrix can be dynamically changed such that the color difference can be rapidly converged so as to obtain a highly natural color image. Although the three main spectral colors RGB are taken for the explanation of the present embodiment, more than three kinds of colors can be taken to perform the color matching process.

Moreover, the number of times of the iteration operation to be performed is not limited.

Table 1 below shows the effect generated when each of the control parameters is adjusted in the embodiments of the color matching method in accordance with the present invention.

TABLE 1

| Coefficient | Effects of larger coefficient | | | |
|---|---|---|---|---|
| | Rise Time | Overshoot | Settling Time | S.S. Error |
| P($K_p$) | Decrease | Increase | Small Change | Decrease |
| I($K_i$) | Decrease | Increase | Increase | Eliminate |
| D($K_d$) | Small Change | Decrease | Decrease | Small Change |

After the above processes have been performed, a final color correction result obtained is shown in FIG. 5. FIG. 5(a) is a diagram showing the picture before the color correction process is performed and the CIE Lab coordinates thereof, and FIG. 5(b) is a diagram showing the picture after the color correction process is performed and the CIE Lab coordinates thereof. In FIG. 5(b), it is clear that the color difference of the image after the color correction process is performed is remarkably converged.

In accordance with the present invention, the color matching method can be performed on a multi-dimensional color, and the number of times of the iteration operation applied to achieve an optimum error value (i.e., minimum color difference) is not limited. That is, in accordance with the present invention, since a multi-dimensional color iteration operation can be adopted, the iteration operation can be recursively performed to update the content values in the 3×3 matrix until the error (i.e., the color difference) is less than the predetermined threshold value.

In accordance with the present invention, based on the currently measured color difference information and the previous color difference information, the value of each of the elements in the fine-tuning matrix can be dynamically adjusted for the calculation of the next iteration operation and further calculations, such that the color difference value can be rapidly converged to an optimum value.

The color matching method in accordance with the present invention can be implemented in a software or firmware manner.

The color matching method in accordance with the present invention can be used in an electronic apparatus, for example, a digital camera, a digital video recorder, a mobile phone or the like, which is provided with a color image capturing device or a display for handling a captured color image, or can be used in a computer system for performing the color matching process on a color image.

While the present invention has been described in detail and pictorially in the accompanying drawings, it is not limited to such details since many changes and modifications recognizable to those skilled in the art may be made to the invention without departing from the spirit and the scope thereof.

What is claimed is:

1. A color matching method for a digital image comprising:
   a step of extracting signals of a plurality of main colors in the digital image as input signals;
   a step of transformation for generating a 3×3 color matrix from the signals of the plurality of main colors and transforming the signals of the plurality of main colors into a 3×1 input matrix formed by the intensity of illumination, the color hue, and the color saturation of each of the color signals, which are referred to as Lab coordinates, and the color matrix and the input matrix are given as follows:

$$\text{the color matrix:} \begin{bmatrix} a_{11} & a_{12} & a_{13} \\ a_{21} & a_{22} & a_{23} \\ a_{31} & a_{32} & a_{33} \end{bmatrix}$$

$$\text{the input matrix:} \begin{bmatrix} L_{in} \\ a_{in} \\ b_{in} \end{bmatrix}$$

wherein each of the elements $a_{11}$ to $a_{33}$ in said color matrix is a real number, and $L_{in}$, $a_{in}$, and $b_{in}$ are respectively representative of the transformed Lab coordinates of each of the color signals; and a step of color-difference calculation for recursively calculating an output value and color difference of the plurality of the color signals by performing an iteration operation based on Equation (1) composed of said color matrix, a weighting matrix and a fine-tuning matrix, until said color difference is smaller than a predetermined threshold value, said color difference is defined as:

$$\Delta E \text{ (color difference)} = \sqrt{(L_{out} - L_{Ref})^2 + (a_{out} - a_{Ref}) + (b_{out} - b_{Ref})^2}$$

wherein $L_{out}$, $a_{out}$, and $b_{out}$ are representative of the obtained Lab coordinates for one of said colors, $L_{Ref}$, $a_{Ref}$, and $b_{Ref}$ are representative of reference values of the obtained Lab coordinates for said one color and the Equation (1) is given as follows:

$$\begin{bmatrix} L_{out} \\ a_{out} \\ b_{out} \end{bmatrix} = \left( \begin{bmatrix} a_{11} & a_{12} & a_{13} \\ a_{21} & a_{22} & a_{23} \\ a_{31} & a_{32} & a_{33} \end{bmatrix} + \begin{bmatrix} w_{11} & w_{12} & w_{13} \\ w_{21} & w_{22} & w_{23} \\ w_{31} & w_{32} & w_{33} \end{bmatrix} \begin{bmatrix} k_{11} & k_{12} & k_{13} \\ k_{21} & k_{22} & k_{23} \\ k_{31} & k_{32} & k_{33} \end{bmatrix} \right) \times \begin{bmatrix} L_{in} \\ a_{in} \\ b_{in} \end{bmatrix} \quad \text{Equation (1)}$$

wherein $$\begin{bmatrix} L_{out} \\ a_{out} \\ b_{out} \end{bmatrix}$$

is the outputted Lab-coordinate matrix of said one color, $$\begin{bmatrix} w_{11} & w_{12} & w_{13} \\ w_{21} & w_{22} & w_{23} \\ w_{31} & w_{32} & w_{33} \end{bmatrix}$$

is said weighting matrix, and $$\begin{bmatrix} k_{11} & k_{12} & k_{13} \\ k_{21} & k_{22} & k_{23} \\ k_{31} & k_{32} & k_{33} \end{bmatrix}$$

is said fine-tuning matrix wherein each of the elements in said fine-tuning matrix is defined as follows:

$k_{ij} = P_{ij} + D_{ij} + I_{ij}$ wherein $P_{ij} = Ep = K_p \times \Delta E(t)$ $D_{ij} = Ed = K_d \times (\Delta E(t) - \Delta E(t-1))$ $I_{ij} = Ei = K_i \int_{-\infty}^{} \Delta E(t) dt$ wherein $K_p$, $K_d$, and $K_i$ are representative of the coefficient of proportional control, the coefficient of derivative control, and the coefficient of integral control.

2. The method as claimed in claim 1, wherein said step of transformation is performed based on the CIE (Commission Internationale De L'Eclairage) standard.

3. The method as claimed in claim 1, wherein the value of each of the elements under the condition of i=j is different from the value of each of the elements under the condition of i≠j in said fine-tuning matrix, whereas the value of each of the elements is identical for i=j and the value of each of the elements is also identical for i≠j.

4. A color image capturing device using the method as claimed in claim 1 to perform a color matching process on a captured color image.

5. A digital camera provided with a color image capturing device and a display, wherein said color image capturing device uses the method as claimed in claim 1 to perform a color matching process on a captured color image.

6. A mobile phone provided with a color image capturing device and a display, wherein said color image capturing device uses the method as claimed in claim 1 to perform a color matching process on a captured color image.

* * * * *